( 12 ) United States Patent
Yoshida et al.

(10) Patent No.: US 7,875,253 B2
(45) Date of Patent: Jan. 25, 2011

(54) DECOMPOSING SYSTEM FOR POLYISOCYANATE RESIDUES, AND START-UP METHOD FOR THE SAME

(75) Inventors: Tadashi Yoshida, Kamisu (JP); Yasumichi Ooto, Kamisu (JP); Akio Saito, Kamisu (JP)

(73) Assignee: Mitsui Chemicals, Inc., Tokyo (JP)

( * ) Notice: Subject to any disclaimer, the term of this patent is extended or adjusted under 35 U.S.C. 154(b) by 341 days.

(21) Appl. No.: 11/988,678

(22) PCT Filed: Jul. 12, 2006

(86) PCT No.: PCT/JP2006/314214

§ 371 (c)(1),
(2), (4) Date: Jan. 11, 2008

(87) PCT Pub. No.: WO2007/007908

PCT Pub. Date: Jan. 18, 2007

(65) Prior Publication Data

US 2009/0137847 A1    May 28, 2009

(30) Foreign Application Priority Data

Jul. 12, 2005    (JP) .............................. 2005-203222

(51) Int. Cl.
*B01J 8/00*      (2006.01)
*B01J 8/08*      (2006.01)
*C07C 211/00*    (2006.01)

(52) U.S. Cl. .................. 422/187; 422/162; 422/213; 422/214; 422/224; 422/901; 564/511; 564/461

(58) Field of Classification Search ................. 422/162, 422/213, 214, 224, 187, 901; 564/511, 461
See application file for complete search history.

(56) References Cited

U.S. PATENT DOCUMENTS 3,128,310 A    4/1964  Koch (Continued)

FOREIGN PATENT DOCUMENTS

EP    0 976 719 A1    2/2000

(Continued)

*Primary Examiner*—Walter D Griffin
*Assistant Examiner*—Lessanework Seifu
(74) *Attorney, Agent, or Firm*—Buchanan, Ingersoll & Rooney, PC.

(57) ABSTRACT

An object of the invention is to provide a decomposing system for polyisocyanate residues that is capable of suppressing reaction of polyisocyanate residues with high temperature and high pressure water to allow smooth start-up of the operation, and a start-up method for the decomposing system for the polyisocyanate residues. The decomposing system is used for hydrolyzing the polyisocyanate residues to polyamine using high temperature and high pressure water, comprising a hydrolyzer, a water feed pipe connected to the hydrolyzer, a residual feed pipe connected to the water feed pipe, a solvent feed line for filling an organic solvent in a solvent filling portion of the residual feed pipe, and a solvent draining line. Upon start-up of the operation, the organic solvent is previously filled in the solvent filling portion via the solvent feed line and the solvent draining line, first, and then, the high temperature and high pressure water is fed from the water feed pipe to the hydrolyzer. Then, the organic solvent is fed from the residual feed pipe to the water feed pipe, first, and then, the polyisocyanate residues are fed thereto.

3 Claims, 1 Drawing Sheet

U.S. PATENT DOCUMENTS

| | | |
|---|---|---|
| 3,410,888 A | 11/1968 | Hammond et al. |
| 4,032,574 A | 6/1977 | Keshi et al. |
| 4,123,601 A * | 10/1978 | Kellum et al. ............... 526/79 |
| 4,137,266 A | 1/1979 | Cassata |
| 5,185,384 A | 2/1993 | Daussin et al. |
| 6,255,529 B1 | 7/2001 | Nagase et al. |
| 6,429,336 B2 | 8/2002 | Dai et al. |
| 6,462,230 B1 | 10/2002 | Nagase et al. |
| 6,630,517 B2 | 10/2003 | Nishida et al. |
| 6,673,960 B1 | 1/2004 | Schwarz et al. |
| 2003/0012710 A1 | 1/2003 | Nishida et al. |
| 2006/0011463 A1 | 1/2006 | Sohn et al. |

FOREIGN PATENT DOCUMENTS

| | | |
|---|---|---|
| FR | 1.364.855 A | 5/1964 |
| FR | 1.364.855 A | 6/1964 |
| GB | 1047101 | 11/1966 |
| GB | 1092019 | 11/1967 |
| GB | 1398975 | 6/1975 |
| JP | 9-151270 | 6/1997 |
| JP | 10-279539 | 10/1998 |
| JP | 2002-518369 A | 6/2002 |
| WO | WO 99/65868 A1 | 12/1999 |
| WO | WO 2004/056761 A1 | 7/2004 |

* cited by examiner

DECOMPOSING SYSTEM FOR POLYISOCYANATE RESIDUES, AND START-UP METHOD FOR THE SAME

TECHNICAL FIELD

The present invention relates to a decomposing system for decomposing polyisocyanate residues to polyamine using high temperature and high pressure water, and a start-up method for the same.

BACKGROUND ART

Polyisocyanate, used as a raw material of polyurethane, is industrially produced, for example, by allowing polyamine to react with carbonyl chloride, for isocyanate reaction.

In this producing plant of polyisocyanate, after completion of the isocyanate reaction, high-molecular-weight polyisocyanate, which is a byproduct produced during the production, is separated from the crude polyisocyanate obtained.

In recent years, it has been proposed that the residues secondarily produced are continuously fed to a reactor vessel in its liquid state, while also high temperature and high pressure water is continuously fed to the reactor vessel, with temperature of the reactor vessel controlled to 190-300° C., whereby the residues are decomposed to polyamine so that the polyamine obtained can be reused (cf. Patent Document 1 cited below, for example).

[Patent Document 1] Japanese Unexamined Patent Publication No. 10-279539.

DISCLOSURE OF THE INVENTION

Problem to be Solved by the Invention

However, in the method described by Patent Document 1 cited above, the high temperature and high pressure water is continuously fed to the reactor vessel through another line separate from a residual feed line, so that the residues and the high temperature and high pressure water are first brought into contact with and mixed with each other in the reactor vessel.

However, this conventional method has the disadvantage that when getting contact with each other in the reactor vessel, the residues and the high temperature and high pressure water cannot be mixed with each other promptly and thoroughly, due to their substantial differences in their own nature.

Patent Document 1 cited above also describes that the high temperature and high pressure water may be made to flow into the residual feed line before the residues are introduced in the reactor vessel.

However, in the case that the high temperature and high pressure water is made to flow into the residual feed line, neither a linear velocity of the feed line nor a temperature rise of the residues is sufficient at a confluence portion upon start-up of an operation, due to which the residues and the high temperature and high pressure water are put in prolonged contact with each other before introduced in the reactor vessel. As a result, many intermediate products, including an urea compound and so on, are produced by the reaction of the residues and the high temperature and high pressure water and solid materials growing out of an urea compound and so on are produced, causing a possible blockage of the feed line.

It is an object of the present invention to provide a decomposing system for polyisocyanate residues that is capable of suppressing reaction of polyisocyanate residues with high temperature and high pressure water to allow smooth start up of decomposition of the polyisocyanate residues. It is another object of the present invention to provide a start up method for the decomposing system for the polyisocyanate residues.

Means for Solving the Problem

The present invention provides a start-up method for a decomposing system for decomposing polyisocyanate residues to polyamine using high temperature and high pressure water, the decomposing system comprising a decomposing tank for allowing polyisocyanate residues and high temperature and high pressure water to contact with each other, a water feed pipe, connected to the decomposing tank, for feeding the high temperature and high pressure water to the decomposing tank, and a residual feed pipe, connected to the water feed pipe, for feeding the polyisocyanate residues to the decomposing tank together with the high temperature and high pressure water, wherein a solvent is previously filled in a connecting portion of the residual feed pipe with the water feed pipe, first, and then, the high temperature and high pressure water is fed from the water feed pipe to the decomposing tank, then, the solvent being fed from the residual feed pipe to the water feed pipe, first, and then, the polyisocyanate residues being fed thereto.

According to the start-up method for the decomposing system for the polyisocyanate residues of the present invention, upon the start-up of the operation, the solvent is first fed from the residual feed pipe to the water feed pipe via which the high temperature and high pressure water is fed to the decomposing tank. Then, a supply flow from the residual feed pipe to the water feed pipe is formed. Due to this, when the polyisocyanate residues are subsequently fed from the residual feed pipe, the polyisocyanate residues are smoothly fed to the water feed pipe at a sufficient linear velocity, going along the supply flow thereof. Thus, the polyisocyanate residues are fully mixed with the high temperature and high pressure water at the confluence portion and then fed to the decomposing tank, without stay at the confluence portion. This can prevent a blockage caused by the production of solid materials growing out of an intermediate product produced by the reaction of the polyisocyanate residues and the high temperature and high pressure water, and can allow smooth start-up of the operation.

Further, in this method, it is preferable that the decomposing system comprises opening and closing unit (preferably flash opening and closing unit) interposed in the residual feed pipe at an end thereof connecting with the water feed pipe, and residual transporting unit interposed in the residual feed pipe at a location thereof on the upstream side of the opening and closing unit, that part of the residual feed pipe extending at least between the opening and closing unit and the residual transporting unit serves as the connecting portion in which the solvent is filled, that the connecting portion is increased in its inner pressure by transporting the solvent or the polyisocyanate residues to the connecting portion by the residual transporting unit in the state of the opening and closing unit being closed, and that the high temperature and high pressure water is fed from the water feed pipe to the decomposing tank, and after a decomposing temperature and a decomposing pressure of the decomposing tank reach a predetermined decomposing temperature and a predetermined decomposing pressure, the opening and closing unit is opened to feed the solvent from the residual feed pipe to a confluence portion thereof with the water feed pipe, first, and then, the polyisocyanate residues are fed thereto.

By feeding the polyisocyanate residues in this manner, a blockage caused by the production of solid materials growing out of an intermediate product produced by the reaction of the polyisocyanate residues and the high temperature and high pressure water can be prevented more effectively, thus allowing smooth start-up of the operation.

The present invention provides a decomposing system for polyisocyanate residues comprising a decomposing tank for allowing polyisocyanate residues and high temperature and high pressure water to contact with each other, a water feed pipe, connected to the decomposing tank, for feeding the high temperature and high pressure water to the decomposing tank, a residual feed pipe, connected to the water feed pipe, for feeding the polyisocyanate residues to the decomposing tank together with the high temperature and high pressure water, and solvent filling unit, interposed in the residual feed pipe at a portion thereof connecting with the water feed pipe, for filling the solvent in it.

According to the decomposing system for the polyisocyanate residues of the present invention, upon the start-up of the operation, the solvent is previously filled in the connecting portion of the residual feed pipe with the water feed pipe by the solvent filling unit. Then, the high temperature and high pressure water is fed from the water feed pipe to the decomposing tank. Thereafter, the solvent is fed from the residual feed pipe to the water feed pipe, first, and then, the polyisocyanate residues are fed thereto. This means that upon start-up of the operation, the solvent is fed from the residual feed pipe to the water feed pipe via which the high temperature and high pressure water is fed to the decomposing tank. Then, a supply flow from the residual feed pipe to the water feed pipe is formed. Due to this, when the polyisocyanate residues are subsequently fed from the residual feed pipe, the polyisocyanate residues are smoothly fed to the water feed pipe at a sufficient linear velocity, going along the supply flow thereof. Thus, the polyisocyanate residues are fully mixed with the high temperature and high pressure water at the confluence portion and then fed to the decomposing tank, without stay at the confluence portion. This can prevent a blockage caused by the production of solid materials growing out of an intermediate product produced by the reaction of the polyisocyanate residues and the high temperature and high pressure water, and can allow smooth start-up of the operation.

It is preferable that this system further comprises opening and closing unit (preferably flash opening and closing unit), interposed in the residual feed pipe at an end thereof connecting with the water feed pipe, and residual transporting unit provided in the residual feed pipe at a location thereof on the upstream side of the opening and closing unit, and that part of the residual feed pipe extending at least between the opening and closing unit and the residual transporting unit serves as the above-mentioned connecting portion in which the solvent is filled.

It is preferable that the solvent is filled in the part between the residual transporting unit and the opening and closing unit, for a further stable start-up of the operation.

According to this system, the solvent or the polyisocyanate residues are transported by the residual transporting unit in the state of the opening and closing unit being closed, whereby the inner pressure of the connecting portion is increased. The high temperature and high pressure water is fed from the water feed pipe to the decomposing tank, and after a decomposing temperature and a decomposing pressure of the decomposing tank reach a predetermined decomposing temperature and a predetermined decomposing pressure, the opening and closing unit is opened to feed the solvent from the residual feed pipe to a confluence portion thereof with the water feed pipe, first, and then, the polyisocyanate residues are fed thereto. This can further effectively prevent a blockage caused by the production of solid materials growing out of an intermediate product produced by the reaction of the polyisocyanate residues and the high temperature and high pressure water, and can allow smooth start-up of the operation.

Effect of the Invention

When a start-up method for a decomposing system for polyisocyanate residues of the present invention is adopted in the decomposing system for polyisocyanate residues of the present invention, a blockage caused by production of solid materials growing out of an intermediate product produced by reaction of the polyisocyanate residues and high temperature and high pressure water can be prevented to allow smooth start-up of the operation.

EXPLANATION OF LETTERS OR NUMERALS

Figure 1:
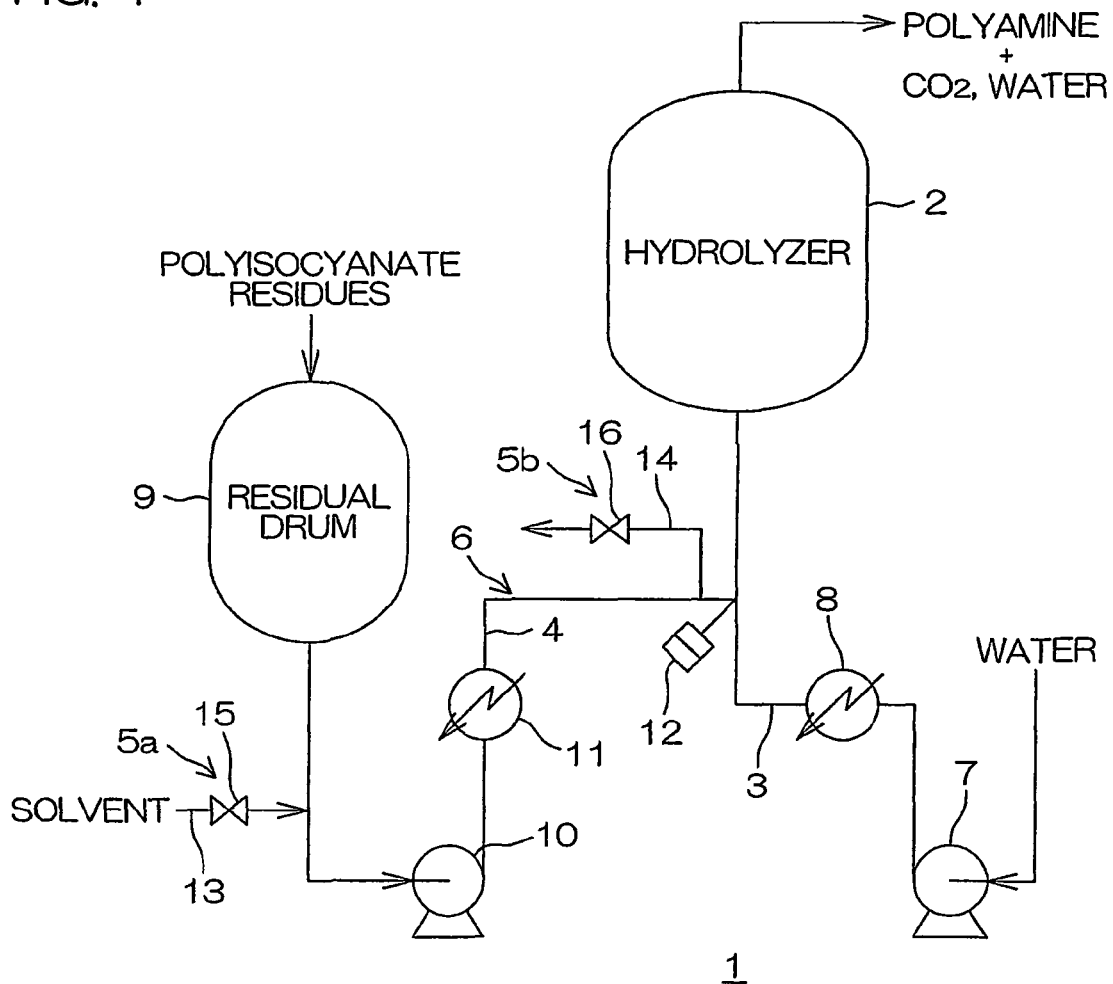
FIG. 1 is a schematic block diagram showing an embodiment of a decomposing system for polyisocyanate residues of the present invention.

1: Decomposing system
2: Hydrolyzer
3: Water feed pipe
4: Residual feed pipe
5a: Solvent feed line
5b: Solvent drain line
6: Solvent filling portion
10: Residual pressure-feed pump
12: Flash opening and closing valve

EMBODIMENT OF THE INVENTION

FIG. 1 is a schematic block diagram showing an embodiment of a decomposing system for polyisocyanate residues of the present invention.

In FIG. 1, a decomposing system 1 is equipped in the producing plant for polyisocyanate, for the purpose of decomposing polyisocyanate residues (distillation residues) to polyamine using high temperature and high pressure water, in the subsequent process of a producing process of producing polyisocyanate and a refining process of extracting polyisocyanate from the crude polyisocyanate (unrefined polyisocyanate) produced in the producing process by distillation operation and the like to separate polyisocyanate from residues (hereinafter referred to as polyisocyanate residues). The decomposing system 1 includes a hydrolyzer 2 served as a decomposing tank, a water feed pipe 3 connected to the hydrolyzer 2, a residual feed pipe 4 connected to the water feed pipe 3, a solvent feed line 5a serving as solvent filling unit for filling organic solvent in a solvent filling portion 6 mentioned later, and a solvent drain line 5b.

The hydrolyzer 2 is a reactor for polyisocyanate residues to be hydrolyzed to polyamine by contact of the polyisocyanate residues with high temperature and high pressure water. It comprises a heat-resistant and pressure-resistant vessel whose temperature and pressure can be controlled.

The water feed pipe 3 is a water feed line for feeding high temperature and high pressure water to the hydrolyzer 2. It comprises a heat-resistant and pressure-resistant pipe whose downstream end is connected to the hydrolyzer 2 and whose upstream end is connected to a water feed line for feeding water (recovered process water or ion-exchange water) not shown.

A water pressure-feed pump 7 for pressure-transporting the high temperature and high pressure water toward the hydrolyzer 2 is interposed in the water feed pipe 3. A water heater 8 is interposed in the water feed pipe 3 at a location on the downstream side of the water pressure-feed pump 7.

The residual feed pipe 4 is a residual feed line for feeding the polyisocyanate residues to the hydrolyzer 2 together with the high temperature and high pressure water. It comprises a heat-resistant and pressure-resistant pipe whose downstream end is connected to the water feed pipe 3 at a location on the downstream side of the water heater 8 and whose upstream end is connected to a residual polyisocyanate drum 9.

The polyisocyanate residues separated in the refining process from the crude polyisocyanate which includes high-molecular-weight polyisocyanate produced in the polyisocyanate producing process is temporality held in the residual polyisocyanate drum 9.

The polyisocyanate residues, which are content of tar containing primarily high-molecular-weight polyisocyanates produced secondarily in the production process, include dimer, trimer, multimeric-polyisocyanate and so on which comprises carbodiimide, uretodion, isocyanurate and uretoneimine.

Polyisocyanates that depend on polyisocyanate produced by a producing plant include, for example, polymethylenepolyphenylene polyisocyanate (MDI), tolylene diisocyanate (TDI), xylylenedi isocyanate (XDI), tetramethylxylylene diisocyanate (TMXDI), bis(isocyanatomethyl) norbornane (NBDI), 3-isocyanatomethyl-3,5,5-trimethylcyclohexyl isocyanate (IPDI), 4,4'-methylenebis(cyclohexylisocyanate) ($H_{12}$MDI), bis(isocyanatomethyl)cyclohexane ($H_6$XDI), and hexamethylene diisocyanate (HDI).

In order to secure fluidity of the polyisocyanate residues, the polyisocyanate residues can be previously adjusted in viscosity by allowing a part of polyisocyanate to coexist with it or by using an organic solvent (e.g. monochlorobenzene and dichlorobenzene) used as a reaction solvent in the production process of polyisocyanate.

A residual pressure-feed pump 10, serving as residual transporting unit for pressure-transporting the polyisocyanate residues toward the water feed pipe 3, is interposed in the residual feed pipe 4. For example, a multistage diaphragm pump is used as the residual pressure-feed pump 10. A residual heater 11 is interposed in the residual feed pump 4 at a location on the downstream of the residual pressure-feed pump 10.

Also, a flash opening and closing valve 12, serving as opening and closing unit (flash opening and closing unit), is interposed in the residual feed pipe 4 at a location thereof on the downstream side of the residual pressure-feed pump 10 and at an end thereof to connect with the water feed pipe 3.

The solvent feed line 5a and the solvent drain line 5b are provided with a solvent feed pipe 13 and a solvent drain pipe 14, respectively.

A downstream end of the solvent feed pipe 13 of the solvent feed line 5a is connected to the residual feed pipe 4 at a location between the residual pressure-feed pump 10 and the residual drum 9. An upstream end of the solvent feed pipe 13 is connected to a solvent tank or a solvent circulation line, not shown. The organic solvent (e.g. monochlorobenzene and dichlorobenzene) used as the reaction solvent in the producing process of polyisocyanate is held or circulated in the solvent tank or the solvent circulation line.

A solvent feed valve 15 for feeding or stopping feeding the organic solvent from the solvent feed pipe 13 to the residual feed pipe 4 is interposed in the solvent feed pipe 13.

The solvent feed pipe 13 of the solvent feed line 5a may be connected to a delivery side (on the downstream side) of the residual pressure-feed pump 10, but it is preferable that the solvent feed pipe 13 is connected to a suction side (on the upstream side) of the same to facilitate pressure rise upon start up of the operation. When the time for a stable start-up is required, there may be separately provided a solvent drum (not shown) to previously hold the solvent in it for the start-up of the operation.

An upstream end of the solvent drain pipe 14 of the solvent drain line 5b is connected to the residual feed pipe 14 at a location between the residual heater 11 and the flash opening and closing valve 12 and in the vicinity of the upstream side of the flash opening and closing valve 12. A downstream end of the same is connected to the solvent tank or the solvent circulation line mentioned above.

A solvent drain valve 16 for draining or stopping draining the organic solvent from the residual feed pipe 4 to the solvent drain pipe 14 is interposed in the solvent drain pipe 14.

In this discomposing system 1, part of the residual feed pipe 4 extending at least between the residual pressure-feed pump 10 and the flash opening and closing valve 12 disposed between the solvent feed pipe 13 and the solvent drain pipe 14 serves as the solvent filling portion 6 of the residual feed pipe 4 connected to the water feed pipe 3, for filling the organic solvent via the solvent feed/draining lines 5.

Next, the decomposing process of decomposing polyisocyanate residues to polyamine by high temperature and high pressure water using the decomposing system is described below.

The decomposing process is performed in continuous operation during which the solvent feed valve 15 and the solvent drain valve 16 are both closed, without the organic solvent being filled in the solvent filling portion 6 of the solvent drain pipe 14, while on the other hand, the flash opening and closing valve 12 is kept open.

The polyisocyanate residues temporarily held in the residual drum 9 is pressure-transported through the residual feed pipe 4 by the residual pressure-feed pump 10, flowing toward the water feed pipe 3 via the flash opening and closing valve 12. Further, the polyisocyanate residues are heated to e.g. 120-180° C. by the residual heater 11. The polyisocyanate residues are increased in pressure to a supply pressure of e.g. 5-30 MPa by the residual pressure-feed pump 10 as well as in temperature to a supply temperature of 120-180° C., thereafter being flown into the water feed pipe 3.

On the other hand, the water flowing in the water feed pipe 3 from the water feed line is pressure-transported through the water feed pipe 3 by the water pressure-feed pump 7, flowing toward the hydrolyzer 2, during which the water is heated to e.g. 190-300° C. by the water heater 8. As a result, the water is increased in pressure to 5-30 MPa as well as in temperature to 190-300° C., thereby to become a high temperature and high pressure water. Then, the high temperature and high pressure water thus produced is flown into the hydrolyzer 2 together with the polyisocyanate residues coming from the residual feed pipe 4.

The hydrolyzer 2 is controlled so that an inner temperature (the decomposing temperature) can be set at e.g. 190-300° C. and an inner pressure (the decomposing pressure) can be set at e.g. 5-30 MPa. Further, a hydrolytic ratio (a weight ratio of (high temperature and high pressure water/polyisocyanate residues)) is controlled to e.g. 0.5-5 under control of the residual pressure-feed pump 10 and the water pressure-feed pump 7.

As a result of this, in the hydrolyzer 2, the polyisocyanate residues are hydrolyzed by the high temperature and high pressure water to produce corresponding polyamine as a decomposition product, while carbon dioxide, water, etc. are produced secondarily.

Polyamines include, for example, polymethylenepolyphenylene polyamine (MDA) corresponding to polymethylenepolyphenylene polyisocyanate (MDI), tolylene diamine (TDA) corresponding to tolylene diisocyanate (TDI), xylylene diamine (XDA) corresponding to xylylenediisocyanate (XDI), tetramethylxylylene diamine (TMXDA) corresponding to tetramethylxylylene diisocyanate (TMXDI), bis (aminomethyl) norbornane (NBDA) corresponding to bis (isocyanatomethyl) norbornane (NBDI), 3-aminomethyl-3,5, 5-trimethylcyclohexyl amine (IPDA) corresponding to 3-isocyanatomethyl-3,5,5-trimethylcyclohexyl isocyanate (IPDI), 4,4'-methylenebis(cyclohexylamine) ($H_{12}$MDA) corresponding to 4,4'-methylenebis(cyclohexylisocyanate) ($H_{12}$MDI), bis(aminomethyl) cyclohexane ($H_6$XDA) corresponding to bis(isocyanatomethyl)cyclohexane ($H_6$XDI), and hexamethylene diamine (HDA) corresponding to hexamethylene diisocyanate (HDI).

Then, after the decomposition products drained from the hydrolyzer 2 is reduced in pressure to the atmospheric pressure, the decomposition products are separated to each in a dehydrating column not shown, and polyamine is collected. The polyamine thus collected is reused as polyamine of raw material in the producing process for polyisocyanate.

Although such decomposing process is performed in continuous operation as mentioned above, the continuous operation is brought to a halt, for example, before and during a maintenance, and after the maintenance, the continuous operation re-starts. In the decomposing system 1, the organic solvent is previously filled in the solvent filling portion 6 as the start-up operation upon start up of the continuous operation. Then, after the high temperature and high pressure water is fed from the water feed pipe 3 to the hydrolyzer 2, the organic solvent is fed from the residual feed pipe 4 to the water feed pipe 3, first, and then, the polyisocyanate residues are fed thereto.

Next, such a start-up operation is described in detail. Before the start-up operation starts, the decomposing system 1 is at a shutdown. The flash opening and closing valve 12, the solvent feed valve 15, and the solvent drain valve 16 are closed, and the water pressure-feed pump 7, the residual pressure-feed pump 10, the water heater 8, and the residual heater 11 are at a standstill. Further, the hydrolyzer 2 is not controlled in the inner temperature and pressure before the start-up, so that it is lower in the inner temperature and pressure before the start-up operation than under the continuous operation.

Upon starting the start-up operation, the solvent feed valve 15 and the solvent drain valve 16 are first opened to allow the organic solvent to flow into the solvent filling portion 6 of the residual feed pipe 4 from the solvent feed pipe 13. At the same time, the polyisocyanate residues staying in the solvent filling portion 6 is washed into the solvent drain pipe 14 by the organic solvent flowing into the solvent filling portion 6, so that the organic solvent is filled therein. After completion of the filling of the organic solvent in the solvent filling portion 6, the solvent feed valve 15 and the solvent drain valve 16 are both closed.

Separately from the above mentioned operation, the water pressure-feed pump 7 and the water heater 8 are brought into operation and the hydrolyzer 2 is controlled, to allow the high temperature and high pressure water to flow into the hydrolyzer 2 from the water feed pipe 3 until the predetermined decomposing temperature and pressure for the continuous operation mentioned above.

Thereafter, the residual pressure-feed pump 10 and the residual heater 11 are brought into operation to pressure-transport the organic solvent and the polyisocyanate residues on the suction side (upstream side) of the residual feed pump 9 toward the organic solvent filled in the solvent filling portion 6, so as to increase the inner temperature and pressure of the solvent filling portion 6. Then, the flash valve 12 is opened at the point of time the inner temperature and pressure of the solvent filling portion 6 exceed the predetermined feed temperature and feed pressure for the continuous operation mentioned above.

Then, the organic solvent is first fed with at least the predetermined feed temperature and pressure for the continuous operation from the residual feed pipe 4 to the water feed pipe 3, via which the high temperature and high pressure water is fed to the hydrolyzer 2, with the predetermined feed temperature and pressure for the continuous operation. When the organic solvent is fed from the residual feed pipe 4 to the water feed pipe 3, a supply flow from the residual feed pipe 4 to the water feed pipe 3 is formed by the organic solvent fed. A rate of the supply flow is, for example, 0.3-3 M/SEC. Then, when the organic solvent filled in the solvent filling portion 6 and the organic solvent on the suction side (upstream side) of the residual pressure-feed pump 9 are all fed to the water feed pipe 3, the polyisocyanate residues are smoothly fed from the residual feed pipe 4 to the water feed pipe 3 with the same power as that of the organic solvent, going along the supply flow of the organic solvent. Then, the polyisocyanate residues flowing into the water feed pipe 3 are fully mixed with the high temperature and high pressure water and then fed to the hydrolyzer 2, without stay at the confluence portion with the water feed pipe 3. This can allow the polyisocyanate residues and the high temperature and high pressure water to be mixed with each other at a sufficient linear velocity before flowing into the hydrolyzer 2. This can prevent a blockage of the water feed pipe 3 which is caused by the production of solid materials growing out of an intermediate product, such as a urea compound, produced by the reaction of the polyisocyanate residues and the high temperature and high pressure water. As a result of this, smooth start up of the decomposing operation can be accomplished.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The decomposing system for polyisocyanate residues and the start-up method for the same of the present invention are suitably used for producing polyisocyanate industrially.

The invention claimed is:

1. A start-up method for a decomposing system for decomposing polyisocyanate residues to polyamine using high temperature and high pressure water, the decomposing system comprising a decomposing tank for allowing the polyisocyanate residues and the high temperature and high pressure water to contact with each other, a water feed pipe connected to the decomposing tank for feeding the high temperature and high pressure water to the decomposing tank, and a residual feed pipe connected to the water feed pipe for feeding the polyisocyanate residues to the decomposing tank together with the high temperature and high pressure water, wherein a solvent is previously filled in a connecting portion of the residual feed pipe with the water feed pipe, then, the high temperature and high pressure water is fed from the water feed pipe to the decomposing tank, then, the solvent is fed from the residual feed pipe to the water feed pipe, first, and then, the polyisocyanate residues are fed thereto.

2. The start-up method for the decomposing system according to claim 1, wherein the decomposing system comprises opening and closing unit interposed in the residual feed pipe at an end thereof connecting with the water feed pipe, and residual transporting unit interposed in the residual feed pipe at a location thereof on an upstream side of the opening and closing unit, wherein part of the residual feed pipe extending at least between the opening and closing unit and the residual transporting unit serves as the connecting portion in which the solvent is filled, wherein the connecting portion is increased in an inner pressure by transporting the solvent or the polyisocyanate residues to the connecting portion by the residual transporting unit in the state of the opening and closing unit being closed, and wherein the high temperature and high pressure water is fed from the water feed pipe to the decomposing tank, and after a decomposing temperature and a decomposing pressure of the decomposing tank reach a predetermined decomposing temperature and a predetermined decomposing pressure, the opening and closing unit is opened to feed the solvent from the residual feed pipe to a confluence portion thereof with the water feed pipe, first, and then, the polyisocyanate residues are fed thereto.

3. The start-up method for the decomposing system for polyisocyanate residues according to claim 2, wherein the opening and closing unit is a flash opening and closing unit.

* * * * *